J. DHEYNE & A. BOVY.
ELASTIC WHEEL TIRE.
APPLICATION FILED FEB. 3, 1909.

943,964.

Patented Dec. 21, 1909.

WITNESSES.
W. H. Berrigan.
John N. Hoving.

INVENTORS,
JULES DHEYNE
and ALBERT BOVY,
by H. Van Oldenneel
Attorney.

UNITED STATES PATENT OFFICE.

JULES DHEYNE AND ALBERT BOVY, OF BRUSSELS, BELGIUM.

ELASTIC WHEEL-TIRE.

943,964. Specification of Letters Patent. Patented Dec. 21, 1909.

Application filed February 3, 1909. Serial No. 475,785.

*To all whom it may concern:*

Be it known that we, JULES DHEYNE and ALBERT BOVY, both subjects of the Belgian King, and residing at Brussels, Belgium, have invented new and useful Improvements in Elastic Wheel-Tires; and we do hereby declare the following to be a full, clear, and exact description of the same.

Our present invention relates to improvements in elastic wheel-tires for motor-cars and the like, the object being to provide a wheel-tire, formed of a plurality of rubber cushions made of particular form and vulcanized at their opposite ends, suitably attached to the rim of the wheel and an outer rim, provided with lateral vertical annular plates, between which are arranged said rubber cushions.

Figure 1:
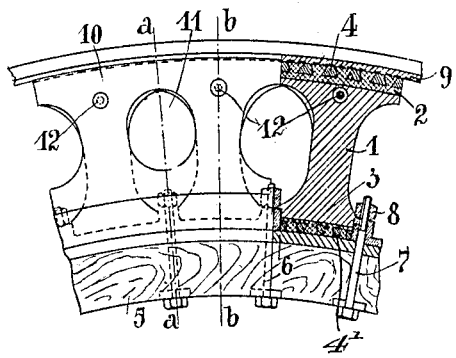
Figure 2:
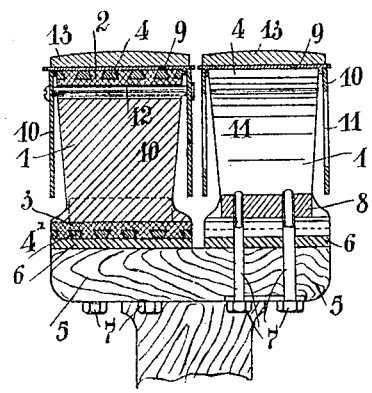

Our invention is fully described and claimed hereinafter, reference being had to the accompanying drawings, wherein:

Figure 1 is a side elevation of a portion of the tire with parts broken away. Fig. 2 shows cross-sections of a wheel-tire formed of double series of rubber cushions, the right hand side of said view being a section taken on line *a—a* and the left hand side a section taken on line *b—b* of Fig. 1.

Our improved wheel-tire is composed of rubber cushions 1, which are I-shaped in cross-section, so as to have a narrow body with comparatively large upper and lower flanges 2, 3. The latter are vulcanized or otherwise hardened, and perforated metal plates 4, 4′, preferably made of aluminium, are embedded in said vulcanized ends 2, 3.

Around the wooden wheel felly, 5, are arranged steel rims 6, on which the rubber cushions 1 are secured by means of screw-bolts 7, 7 extending through the rim 6 and felly 5 and the upper ends of which are secured by oblong nut-blocks 8 arranged between the different cushions 1 and pressing on the bottom flanges 3 thereof.

Fitted around the series of cushions is a metal ring 9, preferably made of steel or iron, and next to these there are lateral annular disks 10, 10. The latter are preferably apertured as indicated by numeral 11, in order to make them less heavy, and connected by cross-pins or screws 12, extending through the upper part of the cushions 1.

The outer rim 9 may be provided with a band 13 of suitable material, such as leather or the like, said band forming the tread of the tire.

It will be readily understood that owing to the particular shape and formation of the rubber cushions 1, the central portions of the latter will be elastic and flexible in any direction, and there will be no relative movement or friction at the flanges 3, 2 attached to the rims 6, 9.

The lateral movements of said flexible portions are limited by the annular disks 10 engaging the nut-blocks 8. Said annular disks serve moreover to reinforce the outer rim 9. In heavy vehicles, the wheels are provided with two or more series of cushions 1 arranged side by side on the wheel-rim as shown in Figs. 2 and 3, a suitable space being provided between the annular disks 10 of the adjacent rims 9, so that when abnormal lateral strain is produced upon one series, the latter engages first the adjacent series before its own disks 10 engage with the corresponding nut-blocks 8.

It is manifest that the means for attaching the tire or cushions to the wheel-rim, may be varied in various ways, without departing from the scope of the invention.

Having fully described our said invention, what we claim and desire to secure by Letters Patent is:—

1. In an elastic wheel-tire, the combination of circular series of rubber cushions, vulcanized flanges formed at opposite ends of said cushions, metal plates embedded in said vulcanized flanges, an outer metal rim fitted around the cushions, and means for attaching the same on the wheel-rim, substantially as set forth.

2. In an elastic wheel-tire, the combination of circular series of rubber cushions, vulcanized flanges formed at opposite ends of said cushions, metal plates embedded in said vulcanized flanges, an outer metal rim fitted around the cushions, and annular disk-plates at opposite sides of said rim.

3. In an elastic wheel-tire, a wheel, a felly therearound, an outer rim, a compressible tire formed with a succession of cushions and disposed between said felly and rim, said tire having vulcanized flanges, metallic plates embedded in said flanges, annular disk-plates attached vertically to opposite sides of said rim, nut blocks arranged between successive cushions and adapted to be engaged by said annular disks under lateral strain, and screw-bolts passing through the felly and engaging the nut blocks.

In testimony whereof, we have signed our names to this specification in the presence of two subscribing witnesses.

JULES DHEYNE.
ALBERT BOVY.

Witnesses:
  CHARLES HOWARD,
  GREGORY PHELAN.